(12) United States Patent
Kikukawa

(10) Patent No.: US 8,081,555 B2
(45) Date of Patent: Dec. 20, 2011

(54) METHOD FOR EVALUATING READ SIGNAL

(75) Inventor: Takashi Kikukawa, Tokyo (JP)

(73) Assignee: TDK Corporation, Tokyo (JP)

( * ) Notice: Subject to any disclaimer, the term of this patent is extended or adjusted under 35 U.S.C. 154(b) by 474 days.

(21) Appl. No.: 12/236,653

(22) Filed: Sep. 24, 2008

(65) Prior Publication Data

US 2009/0080320 A1 Mar. 26, 2009

(30) Foreign Application Priority Data

Sep. 26, 2007 (JP) .................................. 2007-249639

(51) Int. Cl.
*G11B 7/135* (2006.01)
(52) U.S. Cl. .................................................. 369/112.23
(58) Field of Classification Search ............... 369/59.22; 375/262, 263, 341
See application file for complete search history.

(56) References Cited

U.S. PATENT DOCUMENTS

| | | | |
|---|---|---|---|
| 5,488,591 A * | 1/1996 | Kobayashi et al. | 369/13.02 |
| 5,938,791 A | 8/1999 | Narahara | |
| 6,922,384 B2 | 7/2005 | Miyashita et al. | |
| 7,139,231 B2 | 11/2006 | Nagai et al. | |
| 7,403,460 B2 | 7/2008 | Nagai et al. | |
| 7,636,287 B2 * | 12/2009 | Ohkubo et al. | 369/59.22 |
| 2004/0085869 A1 * | 5/2004 | Takehara et al. | 369/44.32 |
| 2004/0257954 A1 * | 12/2004 | Ohkubo et al. | 369/59.21 |
| 2007/0121463 A1 | 5/2007 | Minemura | |
| 2010/0074081 A1 * | 3/2010 | Sasaki et al. | 369/53.35 |
| 2010/0080099 A1 * | 4/2010 | Sasaki et al. | 369/53.15 |
| 2010/0097904 A1 * | 4/2010 | Sasaki et al. | 369/47.14 |

FOREIGN PATENT DOCUMENTS

| | | |
|---|---|---|
| JP | 1021651 A | 1/1998 |
| JP | 10334605 A | 12/1998 |
| JP | 2002230907 A | 8/2002 |
| JP | 2003123402 A | 4/2003 |
| JP | 2003272304 A | 9/2003 |
| JP | 2004158090 A | 6/2004 |
| JP | 2007149180 A | 6/2007 |

OTHER PUBLICATIONS

Official Japanese Letter from corresponding Japanese Patent Application No. JP2007-249639 received Oct. 4, 2011.

* cited by examiner

*Primary Examiner* — Joseph Feild
*Assistant Examiner* — Huy Nguyen
(74) *Attorney, Agent, or Firm* — Porzio, Bromberg & Newman, P.C.

(57) ABSTRACT

A method for evaluating a read signal obtained by irradiating a medium with a laser beam through an objective lens and reading data from the reflected laser beam by a PRML detection method is provided. The method includes: a sampling step of sampling the data obtained from the reflected laser beam at clock timings to obtain sampled values; and a step of, when a constraint length of a PR class in the PRML detection method is an even number, computing an intermediate sampled value for evaluation using at least adjacent two of the sampled values arranged in the order sampled at the clock timings. The provided method is an objective evaluation method when the PRML detection method is used, whereby the selection of a recording medium and a reading apparatus is facilitated.

4 Claims, 14 Drawing Sheets

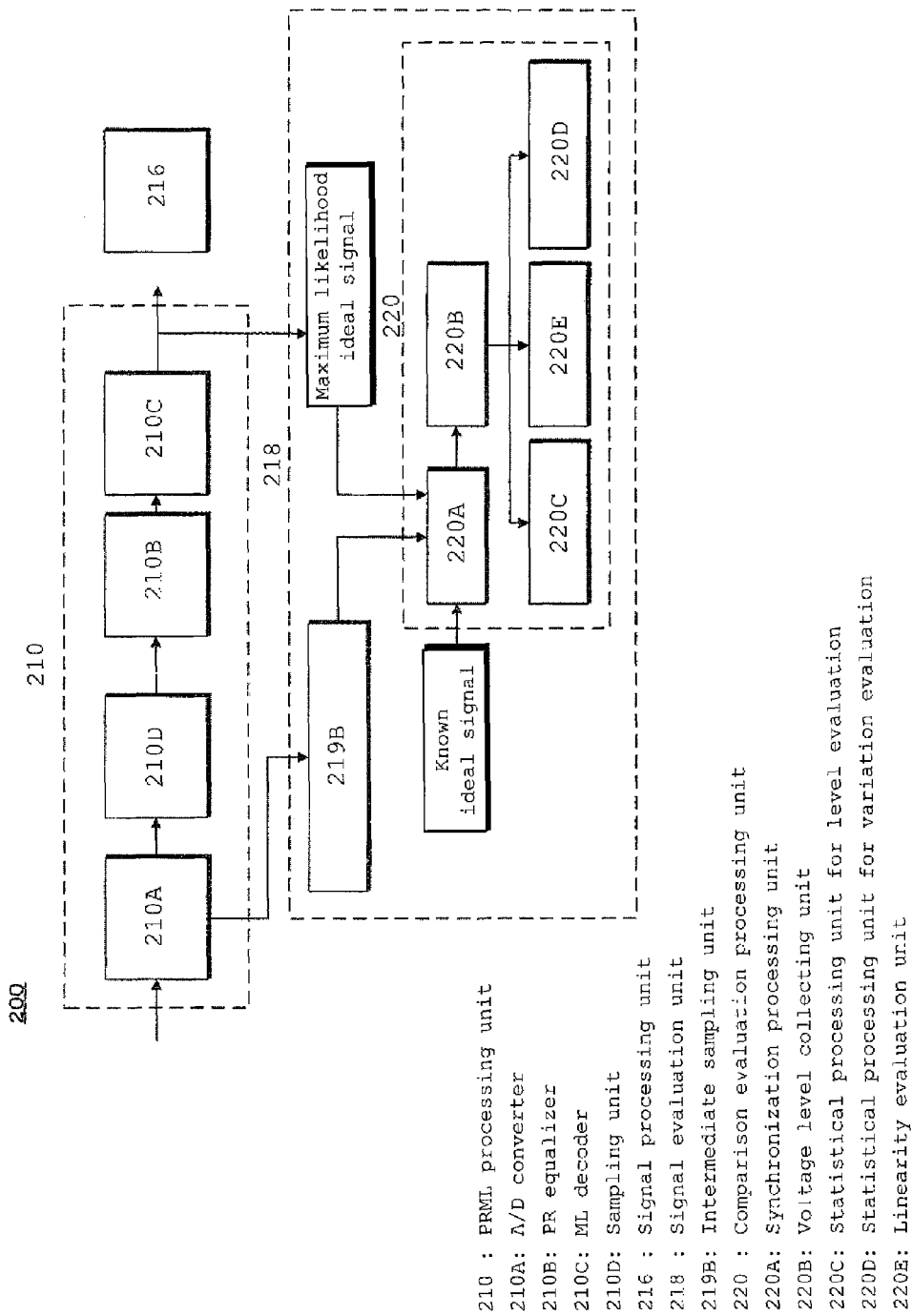

Fig.11

210 : PRML processing unit
210A: A/D converter
210B: PR equalizer
210C: ML decoder
210D: Sampling unit
216 : Signal processing unit
218 : Signal evaluation unit
219B: Intermediate sampling unit
220 : Comparison evaluation processing unit
220A: Synchronization processing unit
220B: Voltage level collecting unit
220C: Statistical processing unit for level evaluation
220D: Statistical processing unit for variation evaluation
220E: Linearity evaluation unit

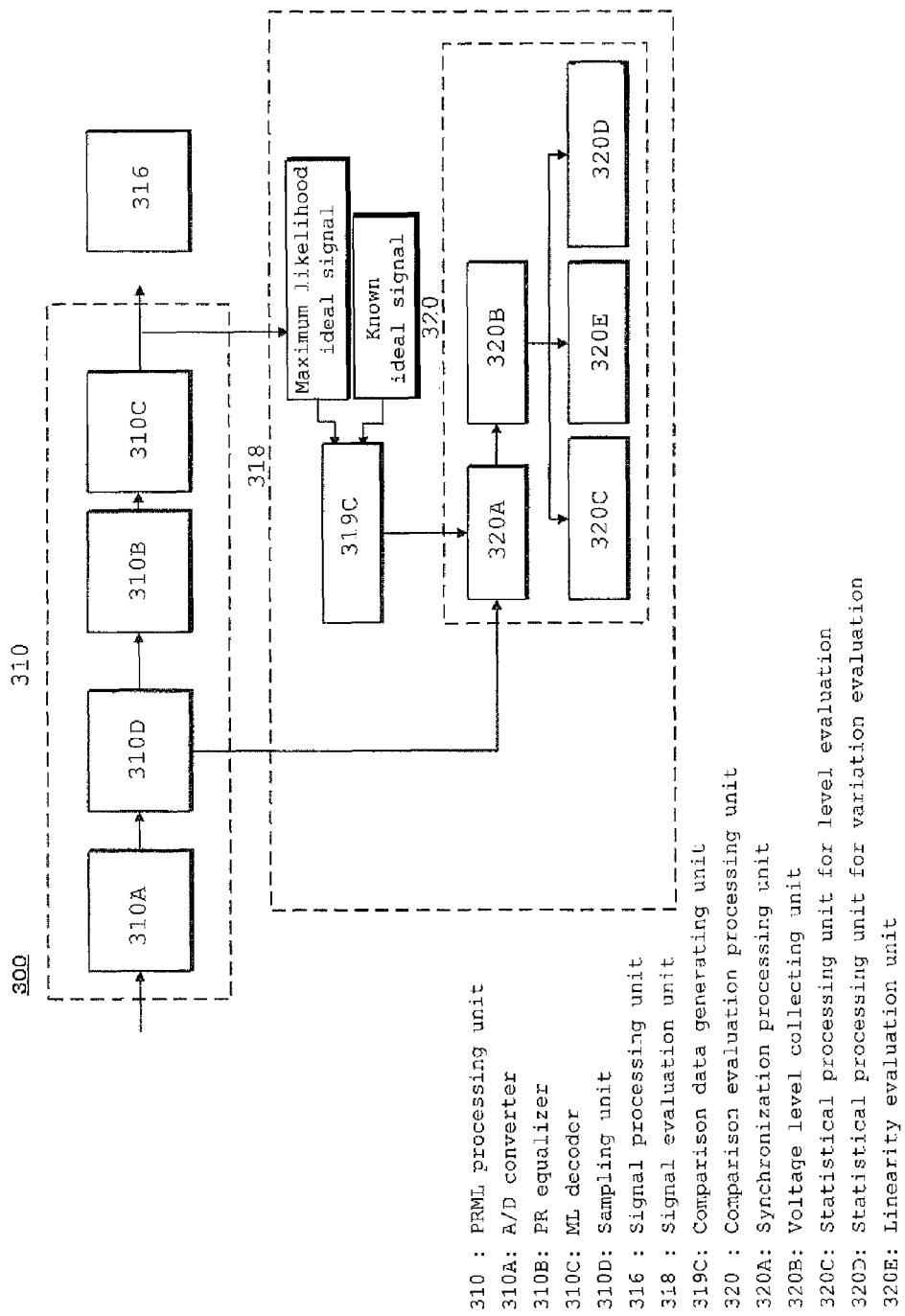

Fig.13

310 : PRML processing unit
310A: A/D converter
310B: PR equalizer
310C: ML decoder
310D: Sampling unit
316 : Signal processing unit
318 : Signal evaluation unit
319C: Comparison data generating unit
320 : Comparison evaluation processing unit
320A: Synchronization processing unit
320B: Voltage level collecting unit
320C: Statistical processing unit for level evaluation
320D: Statistical processing unit for variation evaluation
320E: Linearity evaluation unit

METHOD FOR EVALUATING READ SIGNAL

CROSS REFERENCE TO RELATED APPLICATION

This application claims the benefit of Japanese Patent Application No. 2007-249639 filed on Sep. 26, 2007, the disclosure of which Application is incorporated by reference herein.

BACKGROUND OF THE INVENTION

1. Field of the Invention

The present invention relates to evaluation of signals read from an optical recording medium, and in particular, to evaluation of signals that are read using a PRML detection method.

2. Description of the Related Art

Conventionally, optical recording media such as CD-DAs, CD-ROMs, CD-Rs, CD-RWs, DVD-ROMs, DVD-Rs, DVD+/-RWs, DVD-RAMs, and the like are widely used to watch digital moving image contents and record digital data. Conversely, the recording capacity required of these kinds of optical recording media grows with each passing year and the so-called next-generation optical discs, which can store massive amounts of both moving images and data, have come into commercial use to meet such a requirement. In the next-generation optical discs, the wavelength of a laser beam used for recording and reading is shortened to 405 nm in order to increase their recording capacity.

In the Blu-ray Disc (BD) standard, being one of the next-generation DVD standards, for example, the numerical aperture of an objective lens is set to 0.85 in order to record and read 25 GB of data on and from a single recording layer.

However, the size of moving image and computer data is expected to further increase-in the future. Therefore, it is contemplated to increase the capacity of a disc by reducing the size of recording marks so that the linear recording density of each layer is increased.

Meanwhile, under optical recording-reading conditions in which a laser beam having a wavelength of $\lambda$ and an objective lens having a numerical aperture of NA are used, a so-called resolution limit exists. Specifically, when an encoded signal contains a sequence of a recording mark and a space each having a size equal to or less than $1.0 \times \lambda/4/NA$, the amplitude of the read signal from the train of recording marks and spaces becomes substantially zero. In the current CD, DVD, and BD standards, the size of the minimum recording mark in an encoded signal is greater than $1.0 \times \lambda/4/NA$, and therefore the resolution limit has not been reached. Hence, an amplitude sufficient for reading a signal can be obtained for any combination of recording a train of recording marks/spaces using an appropriate equalizer. Therefore, by slicing a read signal at a certain voltage level, the quality of the read signal can be evaluated according to the positional information (edge jitter) of the intersection of the slice level and the amplitude curve of the read signal.

According to a study undertaken by the inventors, although the study was publicly unknown at the time of filing of the present application, when the size of recording marks is reduced such that the minimum size thereof is equal to or less than $1.1 \times \lambda/4/NA$, the amplitude of a signal from a sequence of a recording mark and a space each having the minimum size is below a practically acceptable level. As described above, when the size of the recording marks is reduced to $1.0 \times \lambda/4/NA$ or less, the amplitude becomes essentially zero due to the resolution limit. In this case, the inventors have also found that signal evaluation using the edge jitter cannot be carried out.

A technique for avoiding such a problem is known as a PRML (Partial Response Maximum Likelihood) detection method and in this method a PR equalizer and an ML decoder (such as a Viterbi decoder) are used. The PR equalizer has a function of correcting a real read signal to match the corrected signal to a reference PR characteristic. One coefficient used for this correction is called an equalization coefficient, and a plurality of equalization coefficients corresponding to different amplitudes of the read signal are provided in the PR equalizer.

In the PRML detection method, when a PR (1, 2, 1) characteristic with a constraint length of 3, for example, is used, an impulse response from a real recorded bit is represented by a sequence having an amplitude of PR (h1, h2, h3). Therefore, in the PR equalizer, the equalization coefficients are used to match the read signal having an amplitude of PR (h1, h2, h3) to the reference PR (1, 2, 1) characteristic, and as such, noise components are eliminated.

The ML decoder computes the deviation of the signal sequence equalized by the PR equalizer from each of all possible ideal responses and selects one ideal response having a minimum cumulative deviation (this ideal response is referred to as a maximum likelihood ideal response). An detection signal is obtained from the maximum likelihood ideal response. In this manner, a correct detection signal can be extracted even when the read signal has a small amplitude and is embedded in noise.

The characteristics of individual optical recording media differ from each other, and the characteristics of optical heads of individual reading devices also differ from each other. In order to cope with these differences, an optimal PR equalizer must be selected, or the equalization coefficients used in the PR equalizer must be adjusted. In addition, an optimal decoder is selected as the ML decoder. In particular, in the future, when the linear recording density per layer is increased, the type of PR equalizer and ML decoder must be very carefully selected using strict criteria.

The determination as to whether or not the PRML detection method is appropriate is often made based on the results of reading experiments using various types of PRML detection methods. However, there is no specific criteria and determination method for optimizing the PRML detection method, so great efforts are required for optimization.

SUMMARY OF THE INVENTION

The present invention has been made in view of the above problems. Accordingly, it is an object of the present invention to facilitate selection of a recording medium and a reading apparatus by providing an objective evaluation method when the PRML detection method is used.

The present inventors have found that, in the PRML detection method, the closer an ideal waveform is to a real read waveform (reflected light) or to a signal sequence obtained by subjecting the real read signal waveform to PR-equalization, the higher the reading quality is. Accordingly, the inventors have recognized that it is very important to objectively evaluate the relationship between a real read waveform and an ideal signal. Moreover, the inventors have found that, when the constraint length in the PR equalizer is an even number, comparative evaluation between an ideal waveform and a read waveform cannot be made properly by directly analyzing the waveforms but can be made with high accuracy by appropriately adjusting the synchronization timing between the ideal signal and the real read waveform or the like. Accordingly, the above object is achieved by the following means.

A first aspect of the present invention for achieving the foregoing object is a method for evaluating a read signal obtained by irradiating a medium with a laser beam through an objective lens and reading data from the reflected laser beam by a PRML detection method, the method including: a sampling step of sampling the data obtained from the reflected laser beam at clock timings to obtain sampled values; and an intermediate data generating step of, when a constraint length of a PR class in the PRML detection method is an even number, computing an intermediate sampled value for evaluation using at least adjacent two of the sampled values arranged in the order sampled at the clock timings.

A second aspect of the present invention for achieving the foregoing object is the read signal evaluation method according to the first aspect, the method further including an evaluation step of comparing the intermediate sampled value with an ideal signal.

A third aspect of the present invention for achieving the foregoing object is the read signal evaluation method according to the first or second aspect, wherein an average value of the adjacent two of the sampled values is used as the intermediate sampled value.

A fourth aspect of the present invention for achieving the foregoing object is a method for evaluating a read signal obtained by irradiating a medium with a laser beam through an objective lens and reading data from the reflected laser beam by a PRML detection method, the method including an intermediate sampling step of, when a constraint length of a PR class in the PRML detection method is an even number, obtaining an intermediate sampled value for evaluation by sampling the data obtained from the reflected laser beam at evaluation sampling timings shifted in phase by a predetermined amount from clock timings.

A fifth aspect of the present invention for achieving the foregoing object is the read signal evaluation method according to the fourth aspect, the method further including an evaluation step of comparing the intermediate sampled value with an ideal signal.

A sixth aspect of the present invention for achieving the foregoing object is the read signal evaluation method according to the fourth or fifth aspect, wherein the evaluation sampling timings are shifted in phase by half cycle from the clock timings.

A seventh aspect of the present invention for achieving the foregoing object is a method for evaluating a read signal obtained by irradiating a medium with a laser beam through an objective lens and reading data from the reflected laser beam by a PRML detection method, the method including: a sampling step of sampling the data obtained from the reflected laser beam at clock timings to obtain sampled values; and a comparison data generating step of, when a constraint length of a PR class in the PRML detection method is an even number, computing an intermediate ideal signal for evaluation using at least adjacent two of output values in an ideal signal.

An eighth aspect of the present invention for achieving the foregoing object is a read signal evaluation method according to the seventh aspect, the method further including an evaluation step of comparing the sampled values with the intermediate ideal signal.

A ninth aspect of the present invention for achieving the foregoing object is the read signal evaluation method according to the seventh or eighth aspect, wherein an average value of the adjacent two of the output values in the ideal signal is used as the intermediate ideal signal.

In the above aspects, examples of the ideal signal include: an ideal signal that is correctly obtained by reading a signal recorded in the medium; an ideal signal that is obtained by deductively reading a signal recorded in the medium by the PRML detection method or the like; an ideal signal that is obtained by storing a known signal, originally recorded in the medium, in another medium such as a memory and reading the known signal therefrom; and an ideal signal previously defined by the specifications for evaluation.

According to the present invention, a read waveform and an ideal signal can be appropriately compared and evaluated. Therefore, the invention has an advantage that the PRML detection method can be efficiently optimized.

BRIEF DESCRIPTION OF THE DRAWINGS

The above and other objects, features and advantages of the present invention will become apparent from the following description and appended claims, taken in conjunction with the accompanying drawings.

FIG. 11 is a block diagram illustrating the internal configuration of a PRML processing unit and a signal evaluation unit used in another embodiment of the reading apparatus;

FIG. 13 is a block diagram illustrating the internal configuration of a PRML processing unit and a signal evaluation unit used in another embodiment of the reading apparatus.

DETAILED DESCRIPTION OF THE PREFERRED EMBODIMENTS

Hereinafter, exemplary embodiments of the present invention will be described in detail with reference to the drawings.

Figure 1:
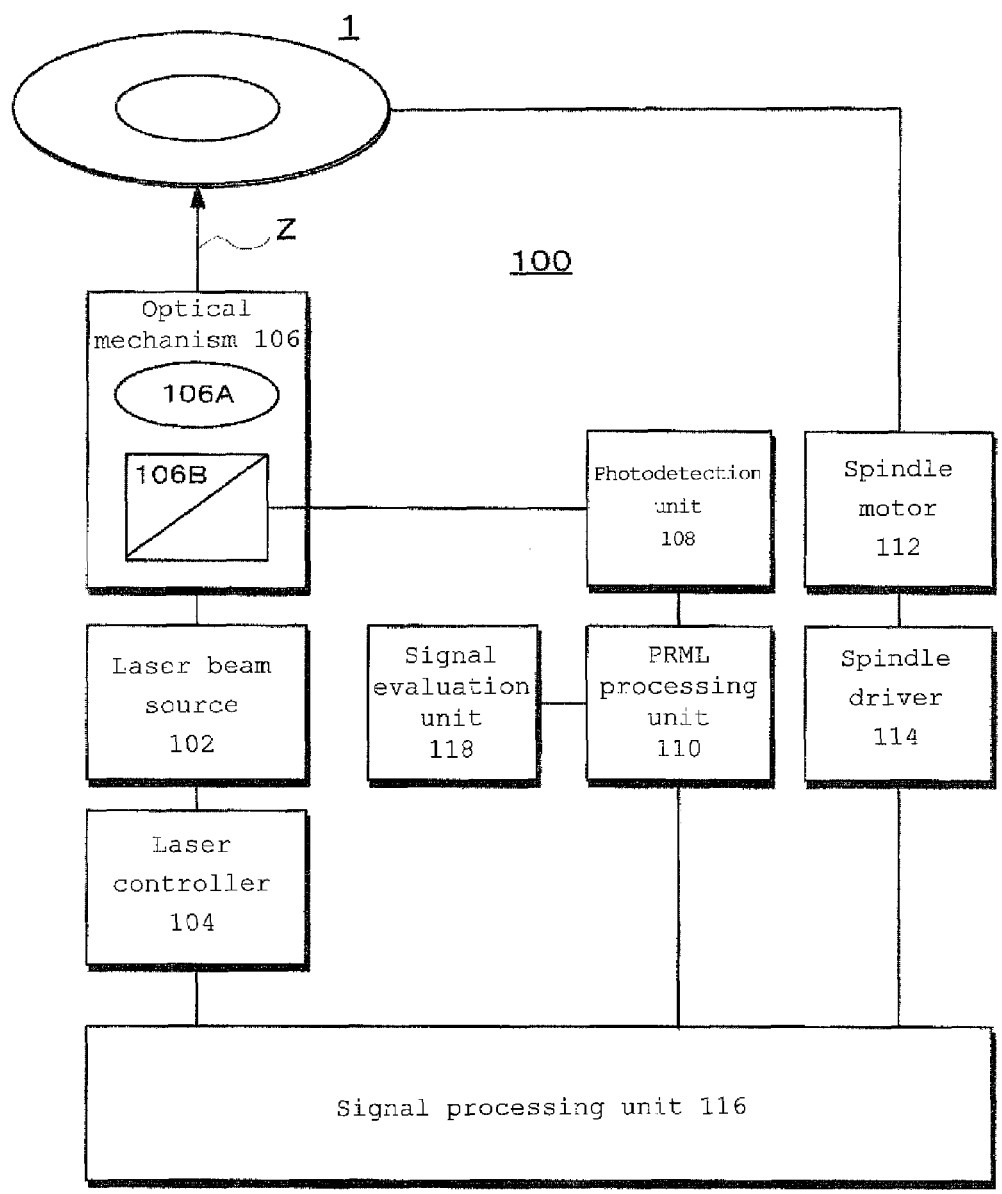
FIG. 1 is a block diagram illustrating the configuration of a reading apparatus for performing a signal evaluation method according to an embodiment of the present invention.

FIG. 1 shows the configuration of a reading apparatus 100 which embodies signal evaluation methods of the embodiments of the present invention. The reading apparatus 100 includes: a laser beam source 102 which generates a laser beam z used for reading; a laser controller 104 which controls the laser beam source 102; an optical mechanism 106 which guides the laser beam Z onto an optical recording medium 1; a photodetection unit 109 which detects the reflected laser beam Z; a PRML processing unit 110 which decodes the information detected by the photodetection unit 108 by means of a PRML detection method; a spindle motor 112 which rotates the optical recording medium 1; a spindle driver 114 which controls the rotation of the spindle motor 112; a signal processing unit 116 which exchanges decoded read data with a CPU (central processing unit, not shown); and a signal evaluation unit 118 which performs signal quality evaluation using the undecoded real signal from the PRML processing unit 110 and an ideal signal (detection signal) obtained in the PRML processing unit 110.

The laser beam source 102 is a semiconductor laser and is controlled by the laser controller 104 to generate the laser beam Z. The optical mechanism 106 includes an objective lens 106A and a polarization beam splitter 106B and can appropriately adjust the focus of the laser beam Z on an information recording layer. The polarization beam splitter 106B extracts the beam reflected from the information recording layer and guides the reflected beam to the photodetection unit 108. The photodetection unit 108 being a photodetector receives the reflected laser beam Z, converts the received beam to an electrical signal, and outputs the electrical signal to the PRML processing unit 110 as a read signal. The PRML processing unit 110 samples the read signal at clock timings, decodes the sampled data, and outputs the decoded binary detection signal to the signal processing unit 116.

In the reading apparatus 100, the wavelength λ of the laser beam Z is set to 400 to 410 nm. In addition, the numerical aperture NA of the objective lens 106A of the optical mechanism 106 is set to 0.84 to 0.86. More specifically, the wavelength λ of the laser beam Z is set to 405 nm, and the numerical aperture NA of the objective lens 106A is set to 0.85. To start-reading information from the optical recording medium 1, the laser beam Z is generated from the laser beam source 102 at a predetermined reading power, and the generated laser beam Z is projected onto the information recording layer of the optical recording medium 1. The laser beam Z is reflected from the information recording layer, and the reflected laser beam Z is extracted through the optical mechanism 106 and is converted to an electrical read output (hereinafter referred to as a real signal) by the photodetection unit 108.

Figure 2:
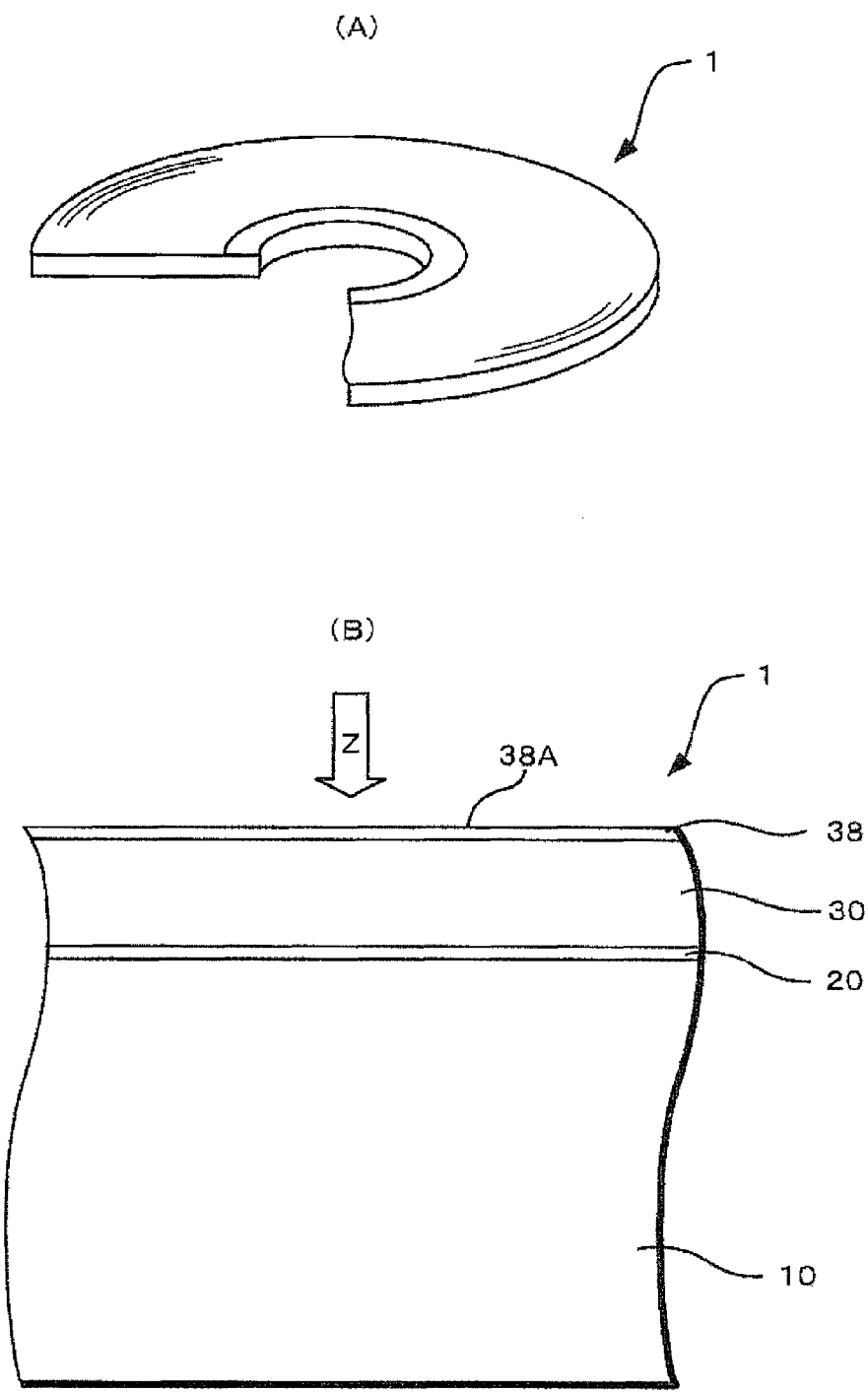
FIGS. 2(A) and 2(B) are enlarged views illustrating the configuration of an optical recording medium used in the reading apparatus.

As shown in FIG. 2(A), the optical recording medium 1 is a disc-like medium having an outer diameter of approximately 120 mm and a thickness of approximately 1.2 mm. As enlarged in FIG. 2(B), the optical recording medium 1 is configured to include a substrate 10, an information recording layer 20, a cover layer 30, and a hard coat layer 35 which are stacked in this order. The cover layer 30 and the hard coat layer 35 have light-transmitting properties and allow the laser beam Z incident from the outside to pass therethrough. Therefore, the laser beam Z incident on a light incident surface 35A passes through the hard coat layer 35 and the cover layer 30 in this order and reaches the information recording layer 20, whereby the information stored in the information recording layer 20 is read. In this optical recording medium 1, the recording capacity of the information recording layer 20 is set to 33.3 GB.

The substrate 10 is a disc-like member having a thickness of approximately 1.1 mm, and various kinds of materials such as glass, ceramic, and resin can be used as the material therefor. In this case, a polycarbonate resin is used. In addition to the polycarbonate resins, other resins such as olefin resins, acrylic resins, epoxy resins, polystyrene resins, polyethylene resins, polypropylene resins, silicone resins, fluororesins, ABS resins, urethane resins, and the like can be used. Of these, the polycarbonate resins and the olefin resins are preferred because of their workability and moldability. Moreover, grooves, lands, pit rows, or the like are formed on the surface on the information recording layer side of the substrate 10, depending on the intended use.

Various materials may be used as the material for the cover layer 30. However, a light-transmitting material must be used to allow the laser beam Z to pass therethrough, as described above. Preferably, an ultraviolet curable acrylicresin, for example, is used. In this optical recording medium 1, the thickness of the cover layer 30 is set to 98 μm, and the thickness of the hard coat layer 35 is set to 2 μm. Therefore, the distance between the light incident surface 35A and the information recording layer 20 is approximately 100 μm.

The information recording layer 20 is a layer for storing data. Examples of the data storage form include a read-only type in which data is written in advance and cannot be overwritten and a recordable type in which a user can write data. In addition, the recordable type is classified into a write-once type and a rewritable type. In the write-once type, data cannot be rewritten in areas in which data has already written. In the rewritable type, written data can be erased, and new data can be rewritten in the areas in which the old data has been erased. In the present embodiment, the information recording layer 20 may be any of the read-only type and the recordable type.

The recording capacity of the information recording layer 20 is determined based on the combination of the size (area) of a recording region and the recording density. The size of the recording region is physically limited. Therefore, in the present embodiment, the recording density is increased by reducing the linear density of recording marks, i.e., the length of a unit recording mark in a spiral direction. In other words, the recording capacity is increased by reducing the spiral direction length of a minimum mark of the recording marks formed in the information recording layer 20. In the present embodiment, the length of the minimum mark is set to 1.1× λ/4/NA or less and preferably 1.0×λ/4/NA or less.

A description will now be given of the PRML processing unit 110 and the PRML (Partial Response Maximum Likelihood) detection method. In the PRML detection method, a suitable PR (Partial Response) reference class characteristic is appropriately selected in accordance with reading characteristics. For example, a constraint length 5 (1, 2, 2, 2, 1) characteristic is selected as the PR reference class characteristic. The constraint length 5 (1, 2, 2, 2, 1) characteristic means that a sampled value (reading response) obtained by sampling the read waveform of a sign bit (channel bit) "1" at a clock timing constrains adjacent five bits (five clock timings) including the above sign bit "1" and that the sequence of the sampled values at the five clock timings can be represented by convolution of sequences "12221" in an ideal case. Therefore, it is assumed that a reading response from any of various actually recorded sign bit sequences is formed by convolution of the sequences "12221." For example, in an ideal case, the response to a sign bit sequence of 00100000 is 00122210. Similarly, the response to a sign bit sequence of 00010000 is 00012221. Therefore, the response to a sign bit sequence of 00110000 is obtained by convolution of the above two responses and is 00134431. Moreover, the response to assign bit sequence of 001110000 is 001356531. In addition, the response to a sign bit sequence of 00111110000 is 0013578753. As described above, when the constraint length 5 (1, 2, 2, 2, 1) characteristic is used, the response obtained, for example, by convolution takes nine levels from 0 to 8.

Similarly, a constraint length 4 (1, 2, 2, 1) characteristic means that a sampled value (reading response) obtained by sampling the read waveform of a sign bit (channel bit) "1" at a clock timing constrains adjacent four bits (four clock timings) including the above sign bit "1" and that the sequence of the sampled values at the four clock timings can be represented by a sequence "1221" in an ideal case. Therefore, the constraint length 4 (1, 2, 2, 1) characteristic means that a reading response to any of various actually recorded sign bits can be represented by convolution of the sequences "1221" in an ideal case. For example, in an ideal case, the response to assign bit sequence of 001000 is 0012210. Similarly, the response to a sign bit sequence of 0001000 is 0001221. Therefore, the response to a sign bit sequence of 0011000 is obtained by convolution of the above two responses and is 0013431. Moreover, the response to a sign bit sequence of 00111000 is 00135531. In addition, the response to a sign bit sequence of 001111000 is 001356531. As described above, when the constraint length 4 (1, 2, 2, 1) characteristic is used, the response obtained by convolution takes seven levels from 0 to 6.

As described above, the above responses obtained using each PR class characteristic are obtained by assuming an ideal state. In this sense, the above responses are referred to as ideal signals. However, the actual signals deviate from the ideal signals since the actual signals contain noises. Therefore, sampled values obtained by sampling an actual read waveform containing noises are compared with pre-estimated ideal signals, and one maximum likelihood ideal signal is selected such that the difference (distance) therebetween is minimized. Then, a decoded signal (detection signal) is obtained from the selected ideal signal. This scheme is referred to as the ML (MaximumLikelihood) detection.

In the ML detection, the Euclidean distance, for example, is used to compute the difference between an ideal signal and an actual sampled value. The Euclidean distance E between an actual sampled value sequence A (=A0, A1, ..., An) and an ideal signal sequence H (=B0, B1, ..., Bn) is defined as $E=\sqrt{\{\Sigma (Ai-Bi)^2\}}$. Therefore, the actual sampled values are compared with a plurality of pre-estimated ideal responses using the Euclidian distance, and the results are ranked according to the Euclidian distance. Then, an ideal response having the smallest Euclidian distance (referred to as a maximum likelihood ideal response) is selected.

Figure 3:
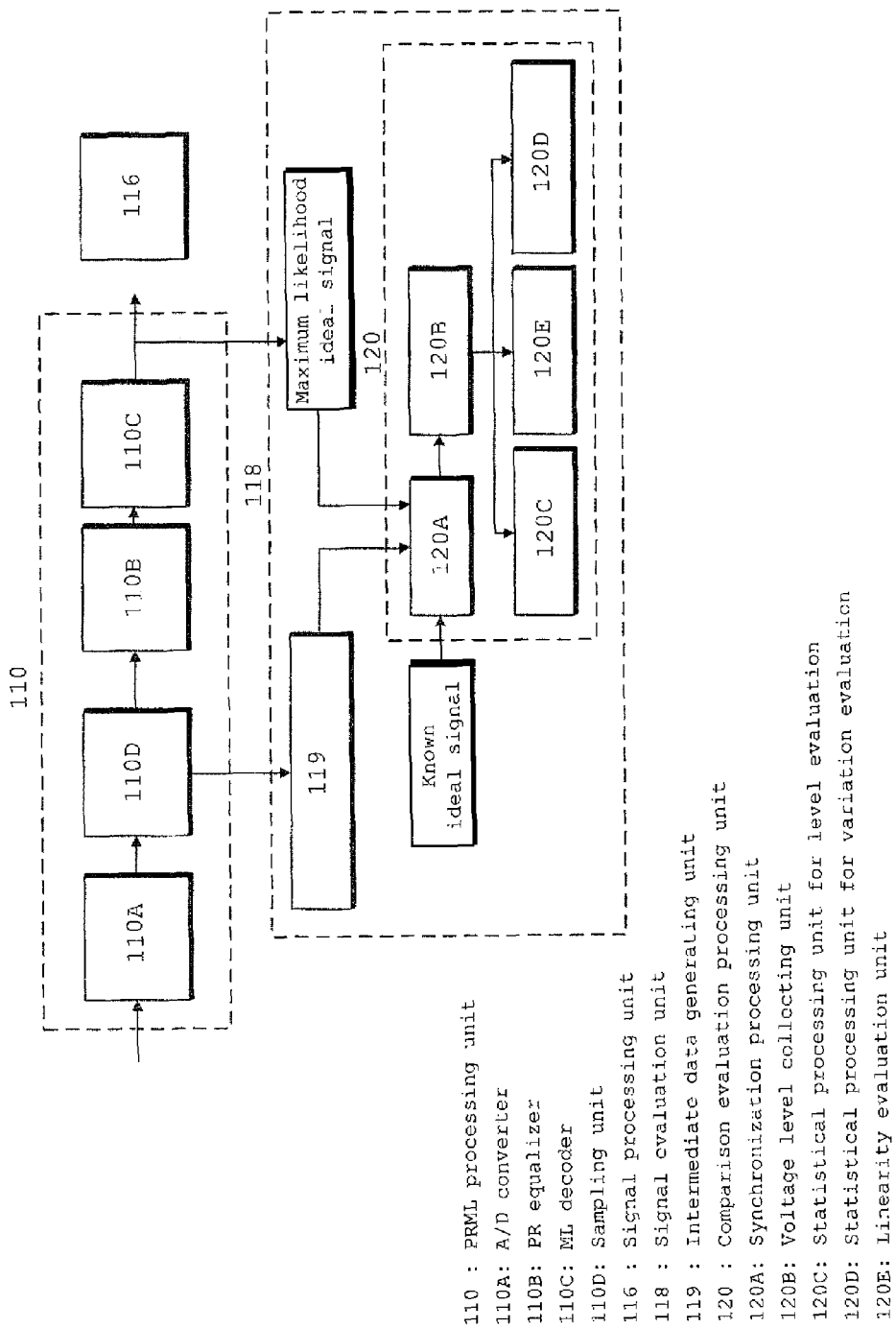
FIG. 3 is a block diagram illustrating the internal configuration of a PRML processing unit and a signal evaluation unit used in the reading apparatus.

As shown in FIG. 3, the PRML processing unit 110 that performs decoding processing using the PRML detection method includes an A/D converter 110A, a sampling unit 110D, a PR equalizer 110B, and an ML decoder 110C. The A/D converter 110A converts an electrical analog signal detected by the photodetection unit 108 to a digital signal serving as a read signal. The sampling unit 110D samples the read signal at clock timings measured from a reference point and obtains sampled values corresponding to voltage levels. The PR equalizer 110B performs equalization processing such that the sampled values come close to a PR reference class characteristic used. When the PR reference class is the constraint length 5 (1, 2, 2, 2, 1) characteristic, the ideal response takes nine levels. Therefore, the sampled values are subjected to equalization processing using nine types (nine taps) of equalization coefficients (Tap coefficients). When the PR reference class is the constraint length 4 (1, 2, 2, 1) characteristic, the ideal response takes seven levels. Therefore, the sampled values are subjected to equalization processing using seven types (seven Taps) of equalization coefficients (Tap coefficients).

Figure 4:
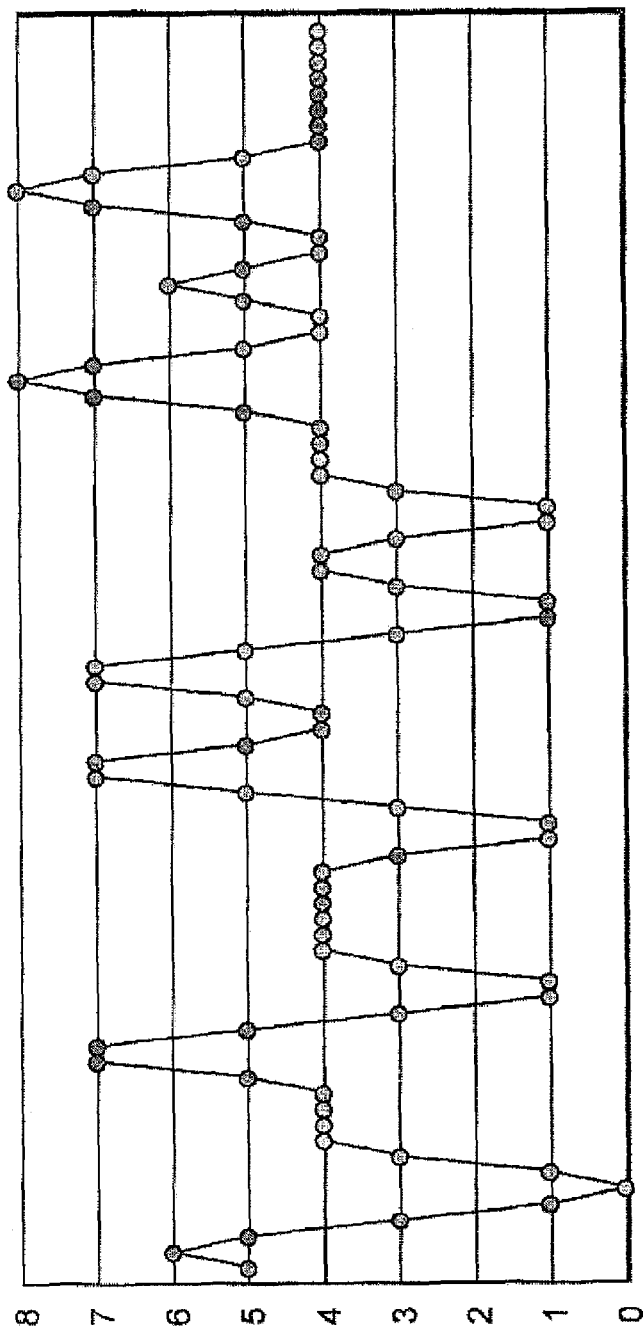
FIG. 4 is a graph showing an example of the waveform of an ideal signal used in the signal evaluation method.

The PR equalizer 110B is described by way of a specific example. In this specific example, a recording density is assumed such that an encoded signal is (1,7) RLL, and an input signal is 001110000011001111000011001100 0011110011110000110001100111110011100111110011 0011. In addition, the PR reference class is represented by the constraint length 5 (1, 2, 2, 2, 1) characteristic. In this case, an ideal signal is obtained by subjecting the input signal to convolution and has a signal waveform shown in FIG. 4. Since the signal sequence shown in FIG. 4 is an ideal signal, all the values are integers. However, when a real read waveform obtained by reading the optical recording medium 1 is sampled at clock timings measured from a certain reference point, the levels of the real read waveform are non-integer values because the recording marks are deformed due to the influence of the physical and chemical properties of the material used for the optical recording medium 1 and the influence of the recording strategy.

In this specific example, a Viterbi decoder is used as the ML decoder 110C, and a most likelihood ideal response is selected using the signal equalized by the PR equalizer 110B, whereby an detection signal is obtained. Specifically, the difference (Euclidian distance) between the equalized signal and each pre-estimated ideal response is computed, and one ideal response giving the smallest difference is selected.

The signal evaluation unit 118 includes an intermediate data generating unit 119 and a comparison evaluation processing unit 120. In detail, the comparison evaluation processing unit 120 includes a synchronization processing unit 120A, a voltage level collecting unit 120B, a statistical processing unit 120C for level estimation, a statistical processing unit 120D for deviation estimation, and a linearity evaluation unit 120E. The comparison evaluation processing unit 120 statistically compares intermediate sampled values obtained in the intermediate data generating unit 119 with a known ideal signal or with an ideal signal (most likelihood ideal signal) obtained by decoding a real signal in the PRML processing unit 110, whereby the signal quality of the intermediate sampled values is evaluated.

The intermediate data generating unit 119 compute each of the intermediate sampled values for evaluation using at least adjacent two of the sampled values arranged in the order sampled at the clock timings when the constraint length of the PR class in the PRML detection method is an even number (when the constraint length is 4 in the present embodiment) Specifically, the average value of the adjacent two sampled values is used as the intermediate sampled value and is output to the comparison evaluation processing unit 120. In this manner, the sampling timing can be virtually shifted in phase by half cycle. When the constraint length is an odd number (when the constraint length is 5 in the present embodiment) the intermediate data generating unit 119 does not compute the intermediate sampled values, and the original actual sampled values are used as the intermediate sampled values and are outputted to the comparison evaluation processing unit 120. This is because when the constraint length is an odd number, the sampling timing is not required to be shifted in phase by half cycle, as described later.

In the synchronization processing unit 120A of the comparison evaluation processing unit 120, the waveform of the ideal signal is synchronized with the intermediate sampled values. Any synchronization method may be used. For example, a specific pattern in the ideal signal may be used as a signal for synchronization, or a PLL is used for synchronization. The ideal signal used is different depending on whether the input signal (recorded signal) is known or unknown. When the signal recorded in the optical recording medium 1 is unknown, a most likelihood ideal signal obtained by decoding the real read signal in the PRML processing unit 110 is used as the ideal signal. When the signal recorded in the optical recording medium 1 is known, this known signal is previously stored in storage means other than the optical recording medium 1. The ideal signal can be obtained by reading the known signal (input signal) and subjecting it to convolution using a reference class characteristic (for example, a constraint length 4 (1, 2, 2, 1) characteristic).

The voltage level collecting unit 120B collects the voltage values of the intermediate sampled values which correspond to the signal levels of the ideal signal for each signal level. When the constraint length is 5, the signal level of the ideal signal takes nine levels from 0 to 8. Therefore, the intermediate sampled values are collected according to the nine levels from 0 to 8. For example, the voltage values of the waveform of the intermediate sampled values are collected for level 0 of the ideal signal. Similarly, the voltage values of the waveform of the intermediate sampled values are collected for each of levels 1 to 8 of the ideal signal.

The statistical processing unit 120C for level estimation computes the average of the collected intermediate sampled values for each signal level, and compares the average with the corresponding signal level of the ideal signal to compute the level difference. If the waveform of the ideal signal (ideal waveform) agrees completely with the waveform of the real signal, the level difference is zero. Practically, the level difference is not zero because the intermediate sampled values deviate from the ideal signal.

The statistical processing unit 120D for deviation estimation computes the variance of the collected values for each signal level. The variance is zero if the ideal signal agrees completely with the waveform of the intermediate sampled values but is not zero in actual cases.

The linearity evaluation unit 120E plots the results obtained in the statistical processing unit 120C for level estimation, for example, such that the signal level value of the ideal signal is plotted on the horizontal axis and the average value of the intermediate sampled values is plotted on the vertical axis. Then, the linearity evaluation unit 120E evaluates the linearity of the plot. If the ideal waveform agrees completely with the waveform of the intermediate sampled values, the linearity of the plot is perfect (the plot is linear). However, since the intermediate sampled values deviate from the ideal signal, the perfect linearity is not obtained in actual cases.

The difference between the waveform of the real signal and the waveform of the ideal signal can be evaluated objectively by the signal evaluation unit 118. The suitability of the combination of the optical recording medium 1 and the PRML detection method can be determined based on the linearity between the real signal and the ideal signal, or on the variance at each signal level. Specifically, the higher the linearity, or the closer the variance to zero, the better the suitability.

A description will now be given of the operation of the intermediate data generating unit 119.

As described above, when the constraint length of the PR class in the PRML detection method is an even number (when the constraint length is 4 in the present embodiment), the intermediate data generating unit 119 outputs the average of adjacent two of the sampled values in the order sampled at the clock timings as the intermediate sampled value. However, when the constraint length is an odd number (when the constraint length is 4 in the present embodiment), the intermediate data generating unit 119 outputs, as the intermediate sampled value, the as-obtained actual sampled value.

Figure 5:
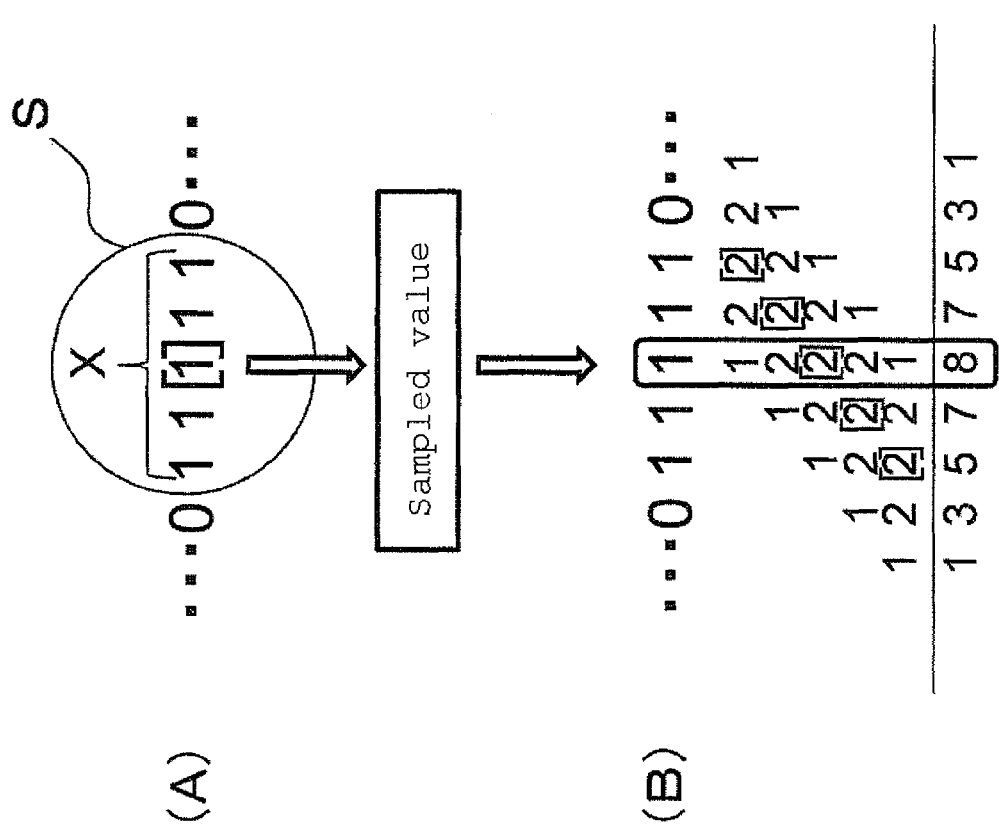
FIGS. 5(A) and 5(B) are conceptual views describing the operation of an intermediate data generating unit in the signal evaluation unit.

FIGS. 5(A) and 5(B) show the case in which the constraint length is an odd number (the constraint length is 5 in the illustrated case). FIG. 5(A) shows the state in which data obtained from the reflected beam is sampled at the clock timing when the fourth bit [1] from the left in a sign bit sequence (011[1]110) recorded in the optical recording medium 1 reaches the center of the beam spot S of the laser beam Z. The sampled value constrains a five-bit sequence X including the bit [1] at the center and takes a non-integer value close to 8. The intermediate data generating unit 119 outputs the sampled value without any processing to the comparison evaluation processing unit 120.

FIG. 5(B) shows an ideal signal obtained by subjecting a known signal sequence (0111110) recorded in the optical recording medium 1 to convolution computation. Specifically, the ideal signal is formed by performing the convolution computation such that the central value [2] in the constraint length 5 (12[2]21) is synchronized with the bit [1] in the signal sequence. For example, the level of an ideal signal corresponding to the fourth bit [1] from the left in the signal sequence (011[1]110) is an integer of 8. The synchronization processing unit 120A of the comparison evaluation processing unit 120 synchronizes the sampled value with the ideal signal and compares the sampled value (a non-integer value close to 8) with the ideal signal (an integer value of 8) to thereby evaluate the signal quality. The above comparison evaluation can be made because the phase of the sampled value obtained by reading the signal sequence (0111110) can be matched with the phase of the ideal signal obtained by subjecting the signal sequence (0111110) to convolution using the constraint length 5 (12221).

Figure 6:
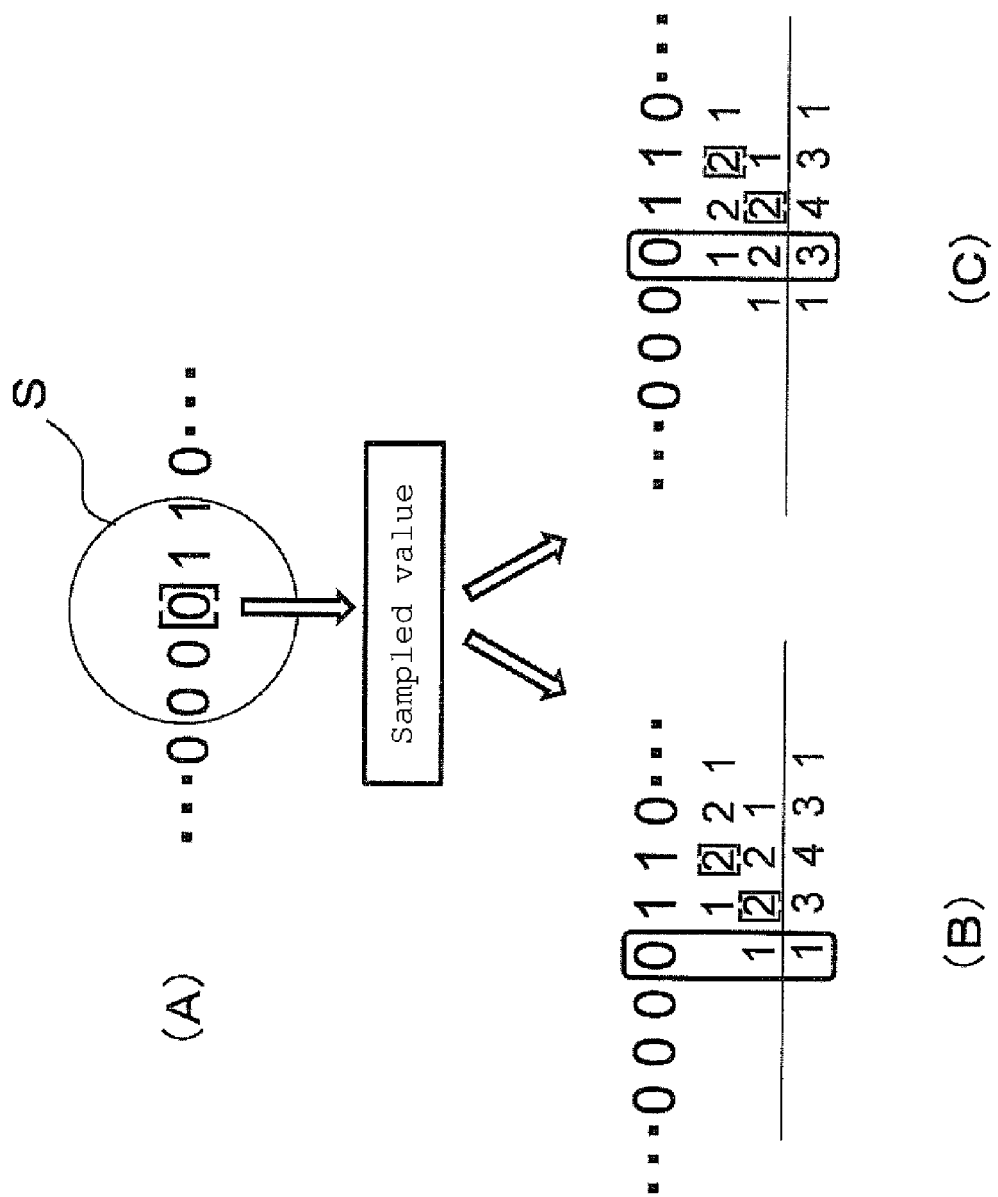
FIGS. 6(A) to 6(C) are conceptual views describing the operation of the intermediate data generating unit in the signal evaluation unit.

FIGS. 6(A) to 6(C) show the case in which the constraint length is an even number (the constraint length is 4 in the illustrated case) FIG. 6(A) shows the state in which data obtained from the reflected beam is sampled at the clock timing when the fourth bit [0] from the left in a signal sequence (000[0]110) recorded in the optical recording medium 1 reaches the center of the beam spot S of the laser beam Z. An ideal signal can take two different levels depending on the manner of the convolution computation. FIG. 6(B) shows an ideal signal obtained by performing convolution computation such that the value [2] on the left side in the constraint length 4 (1[2]21) (the second value [2] from the left) is synchronized with [1] in the signal sequence. In this case, the level of the ideal signal that corresponds to the fourth bit [0] from the left in the signal sequence (00[0]110) is 1. FIG. 6(C) shows an ideal signal obtained by performing convolution computation such that the value [2] on the right side in the constraint length 4 (12[2]1) (the third value [2] from the left) is synchronized with [1] in the signal sequence. In this case, the level of the ideal signal that corresponds to the fourth bit [0] from the left in the signal sequence (000[0]110) is 3. In both cases, when the constraint length 4 (1221) is used, the original sampled values cannot be synchronized with the ideal signal since they are shifted in phase by half cycle.

Figure 7:
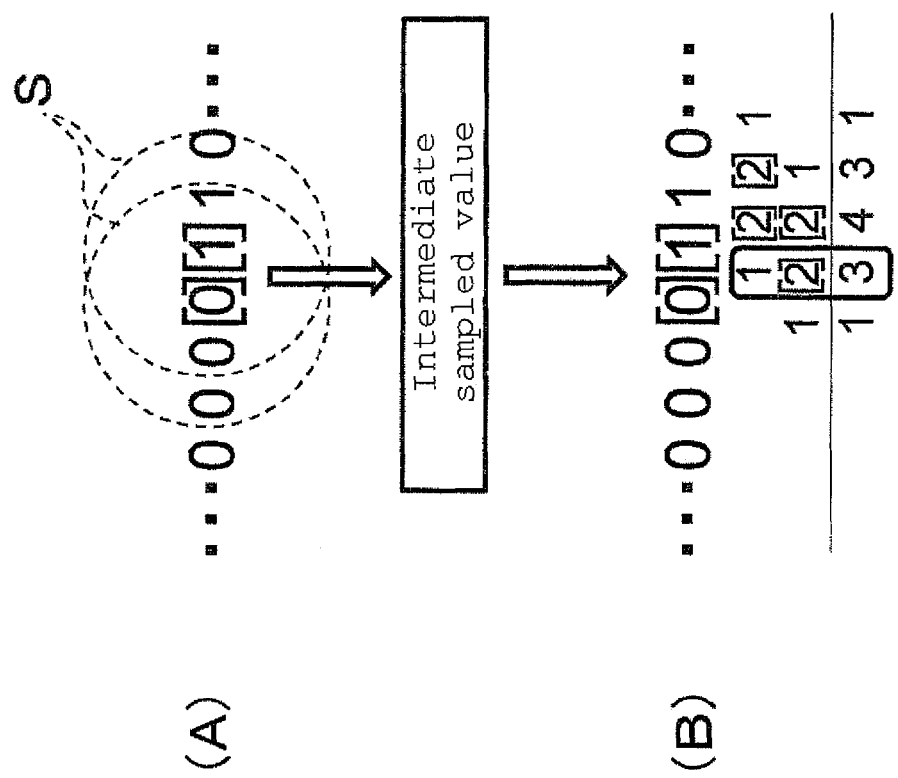
FIGS. 7(A) and 7(B) are conceptual views describing the operation of the intermediate data generating unit in the signal evaluation unit.

Accordingly, in the present embodiment, as shown in FIG. 7(B), the ideal signal is obtained by performing convolution computation such that the midpoint in the constraint length (1[2][23]), i.e., the midpoint between the value [2] on the left side and the value [2] on the right side, is synchronized with [1] in the signal sequence. In this manner, the ideal waveform obtained as the reflected beam from a bit [1] can be correctly represented as [1221], and the phase of the ideal waveform can also be correctly represented. However, the ideal signal sequence is shifted in phase by half cycle from the bit sequence recorded in the optical recording medium 1. In order to address this problem, the intermediate data generating unit 119 computes, as the intermediate sampled value, the average of adjacent two of the sampled values arranged in the order sampled at the clock timings and adjusts the phase of the computed intermediate sampled value to the phase of the ideal signal, as shown in FIG. 7(A). Specifically, with this intermediate sampled value, a state is virtually generated in which the sampling is performed at the timing of the ideal signal (the timing shifted in phase by half cycle from the real clock timing). In the synchronization processing unit 120A, for example, the intermediate sampled value computed from the fourth bit [0] and fifth bit [1] from the left in the signal sequence (000[0] [1]110) can be correctly compared with the level 3 of the ideal signal that is obtained by subjecting the sign bit sequence (0000110) to convolution computation and that is located between the fourth and fifth bits from the left.

Figure 8:
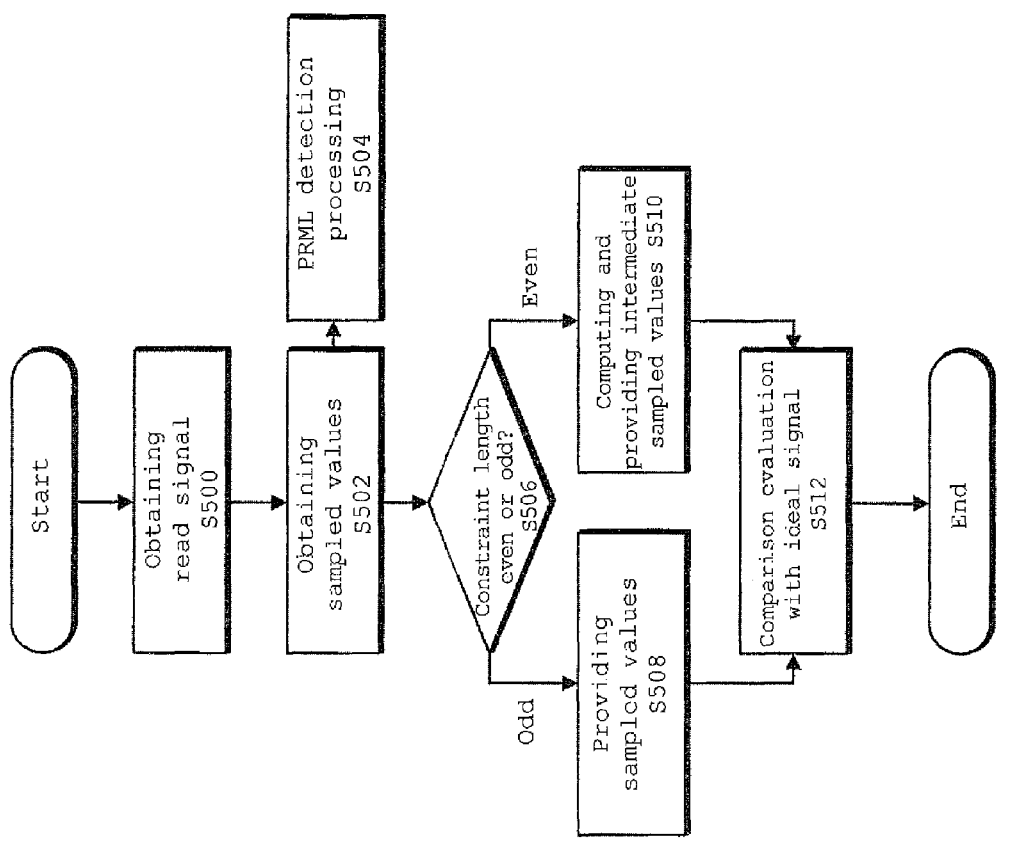
FIG. 8 is a flowchart showing the signal evaluation method using the reading apparatus.

Next, the procedure for signal evaluation using the reading apparatus 100 of the present embodiment is described using a flowchart shown in FIG. 8.

First, in step 500, the optical recording medium 1 is irradiated with the laser beam Z, and the reflected beam is converted to an analog electrical signal in the photodetection unit 108. Then, a digital read signal is obtained using the A/D converter 110A. Subsequently, in step 502, the read signal is sampled at predetermined clock timings by the sampling unit 110D, where by sampled values are obtained. In step 504, the sampled values are subjected to PR equalization and ML decoding in the PRML processing unit 110, whereby final data is obtained.

In step 506, a determination is made as to whether the constraint length of the PRML processing unit 110 in the reading apparatus 100 is an even number or an odd number. If the constraint length is an odd number, the original sampled values are provided to the comparison evaluation processing unit 120 in step 508. If the constraint length is an even number in step 506, the process proceeds to step 510. In step 510, the intermediate data generating unit 119 computes each intermediate sampled value shifted in phase by half cycle by determining the average of adjacent two of the sampled values arranged in the order sampled at the clock timings. The intermediate sampled value is provided to the comparison evaluation processing unit 120.

Subsequently, in step 512, the comparison evaluation processing unit 120 compares the provided (intermediate) sampled values with the ideal signal obtained based on a known bit sequence recorded in the optical recording medium 1 or with a most likelihood ideal signal obtained in the ML decoder 110C of the PRML processing unit 110, whereby the signal quality is evaluated. The evaluation may be made by comparing the sampled values with the levels of the ideal signal to determine whether their waveforms are close to each other or, as describe above, by collecting the sampled values for each voltage range and statistically determining the similarity of the waveforms using the average and variance.

As described above, in the present embodiment, when the constraint length is an even number, the intermediate sampled values are computed from the sampled values sampled at the clock timings. In this manner, theoretically, the timing for each level value that defines the waveform of the ideal signal can be matched with the timing for each intermediate sampled value. Therefore, the waveform of the read signal and the waveform of the ideal signal can be correctly compared and evaluated, and the signal quality can be evaluated with high accuracy.

A description will now be given of an example in which a real signal was evaluated using the reading apparatus 100 when the input signal was known.

A stacked structure of a polycarbonate substrate (1.1 mm), a $TiO_2$ layer (4 nm), an $Fe_2O_3$ layer (3 nm), a $TiO_2$ layer (6 nm), a Bi-Ge-O layer (35 nm), a $TiO_2$ layer (8 nm), and a light-transmitting ultraviolet curable resin layer (0.1 mm) was used as the optical recording medium 1. The evaluation of the optical recording medium 1 was performed using an optical disc evaluation apparatus (ODU-1000, product of Pulstec Industrial Co., Ltd.) with a wavelength $\lambda$ of 405 nm and a numerical aperture NA of 0.85. To evaluate recording-reading characteristics, the clock frequency was set to 66 MHz, and the linear rotation speed of the disc was set to 4.1 m/s. In addition, a (1,7) RLL input signal was read under the above conditions. Under the above evaluation conditions, the physical size of the smallest recording mark in the encoded signal was approximately 113 nm and was smaller than $1.0 \times \lambda/4/NA = 119$ nm. In consideration of the physical specifications of BD, this enables a 12 cm disc to have a capacity corresponding to 30 GSB per layer.

Figure 10:
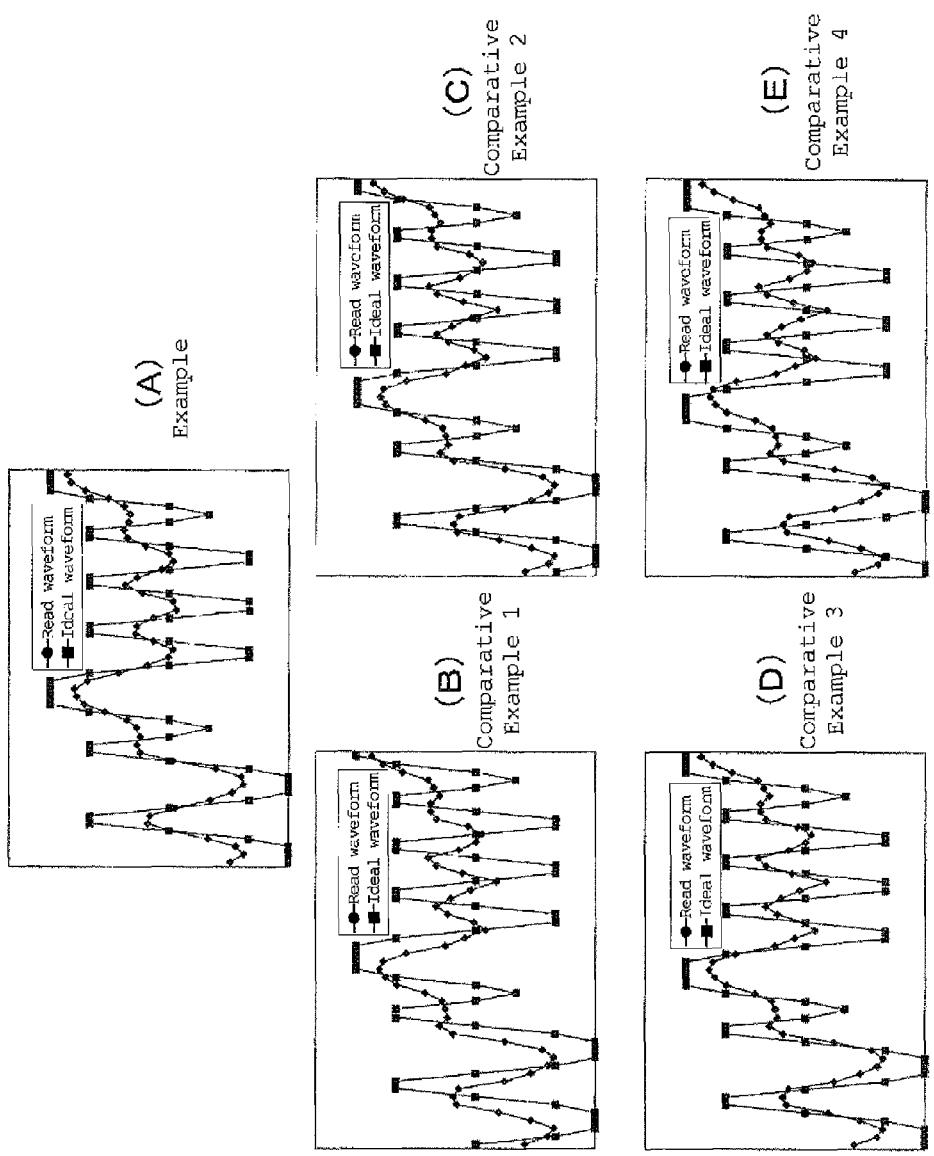
FIGS. 10(A) to 10(E) are graphs showing the evaluation results of Example and Comparative Examples that are obtained by the use of the signal evaluation methods.

The optical recording medium 1 was read using the reading apparatus 100, and the read signal was sampled at clock timings synchronized with the recorded bits. The average of adjacent two of the sampled values was computed and used as the intermediate sampled value. The intermediate sampled values were synchronized with the ideal signal recorded in the optical recording medium 1. The ideal signal was obtained by subjecting a known bit sequence recorded in the optical recording medium 1 to convolution computation using a PR class (1221) of a constraint length 4. FIG. 10(A) is a graph showing both the intermediate sampled values and the ideal signal.

Figure 9:
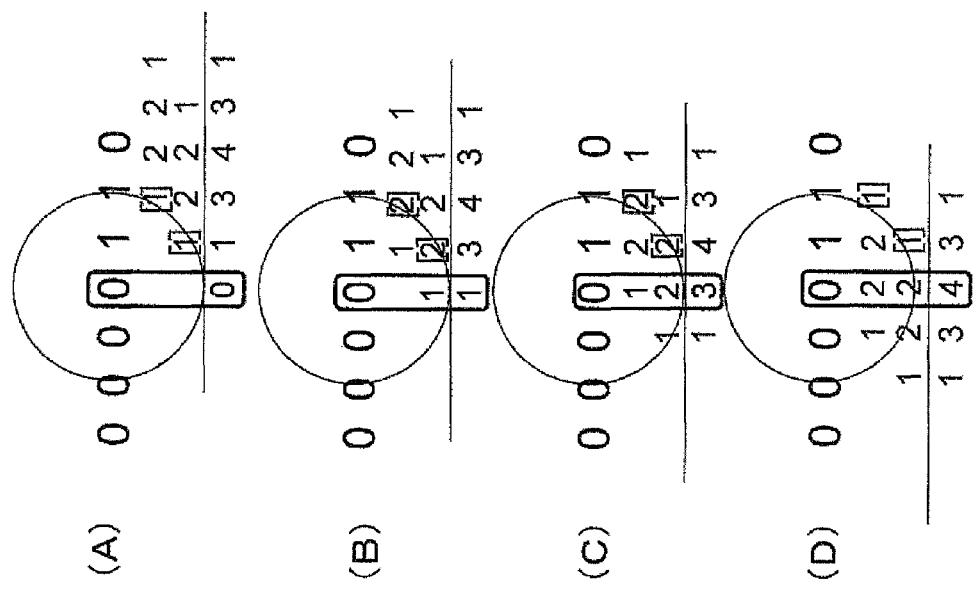
FIGS. 9(A) to 9(D) are conceptual views describing signal evaluation methods of Comparative Examples 1 to 4.

In Comparative Example 1, the ideal signal was obtained by performing convolution computation such that the left value [1] in the PR class ([1] 221) of a constraint length 4 is synchronized with a corresponding bit, as shown in FIG. 9(A). FIG. 10(B) is a graph showing both the intermediate sampled values and the ideal signal. In Comparative Example 2, the ideal signal was obtained by performing convolution computation such that the second value [2] from the left in the PR class (1[2]21) of a constraint length 4 is synchronized with a corresponding hit, as shown in FIG. 9(B) FIG. 10(C) is a graph showing both the intermediate sampled values and the ideal signal. In Comparative Example 3, the ideal signal was obtained by performing convolution computation such the third value [2] from the left in the PR class (12[2]1) of a constraint length of 4 is synchronized with a corresponding bit, as shown in FIG. 9(C). FIG. 10(D) is a graph showing both the intermediate sampled values and the ideal signal. In Comparative Example 4, the ideal signal was obtained by performing convolution computation such that the fourth value [1] from the left in the PR class (122[1]) of a constraint length of 4 is synchronized with a corresponding bit, as shown in FIG. 9(D). FIG. 10(E) is a graph showing both the intermediate sampled values and the ideal signal.

As can be seen from FIG. 10(A), the waveform of the sampled values and the waveform of the ideal signal were best synchronized in the Example, and the signal quality can be evaluated appropriately by comparing and evaluating the waveforms. However, as can be seen from FIGS. 10(C) and 10(D), the synchronization of the waveforms was poor in Comparative Examples 2 and 3. Therefore, the quality of the read signal cannot be appropriately evaluated by comparing the as-obtained signals. As can be seen from FIGS. 10(B) and 10(E), the synchronization of the signals was poorer in Comparative Examples 1 and 4 than in Comparative Examples 2 and 3, and it is substantially impossible to evaluate the signal quality.

In the above embodiments and Example, the intermediate data generating unit computes the intermediate sampled values using the sampled values, but the present invention is not limited thereto. For example, in a reading apparatus 200 shown in FIG. 11, a signal evaluation unit 218 includes an intermediate sampling unit 219B instead of the intermediate data generating unit. The intermediate sampling unit 219B directly samples the data obtained from the reflected laser beam at evaluation sampling timings which are shifted in phase by a predetermined amount (half cycle is this case) from the sampling clock timings set by a sampling unit 210D when the constraint length of the PR class in the PRML detection method is an even number, whereby obtaining the intermediate sampled values for evaluation. The intermediate sampled values are provided to a comparison evaluation processing unit 220 and are compared with the ideal signal to make the evaluation, as in the reading apparatus 100 shown in FIG. 3.

Figure 12:
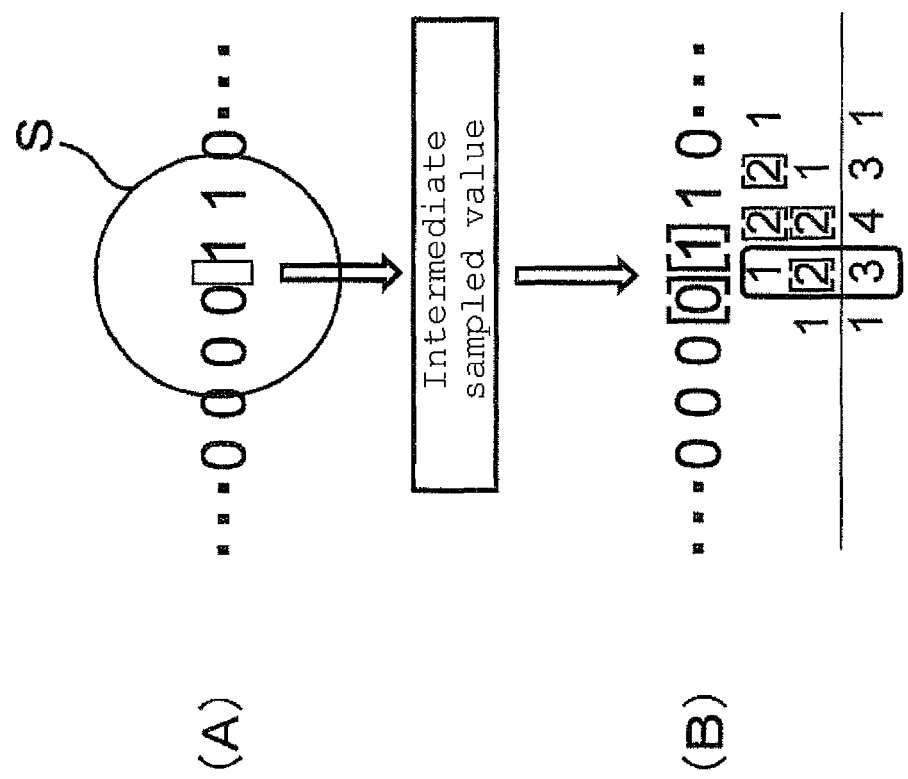
FIGS. 12(A) and 12(B) are conceptual views describing the operation of an intermediate sampling unit in the signal evaluation unit.

With the reading apparatus 200, the intermediate sampled values can be directly obtained at the sampling timings which are shifted in phase by half cycle from the normal clock timings, as shown in FIG. 12. Therefore, when the constraint length is an even number, more correct intermediate sampled values can be used for comparison evaluation with the ideal signal shifted in phase by half cycle from the respective bits, whereby the signal quality can be evaluated with high accuracy. Since the other components of the reading apparatus 200 are the same as those of the reading apparatus 100, the detailed description thereof is omitted by using the same last two digits as those in FIG. 11.

Figure 14:
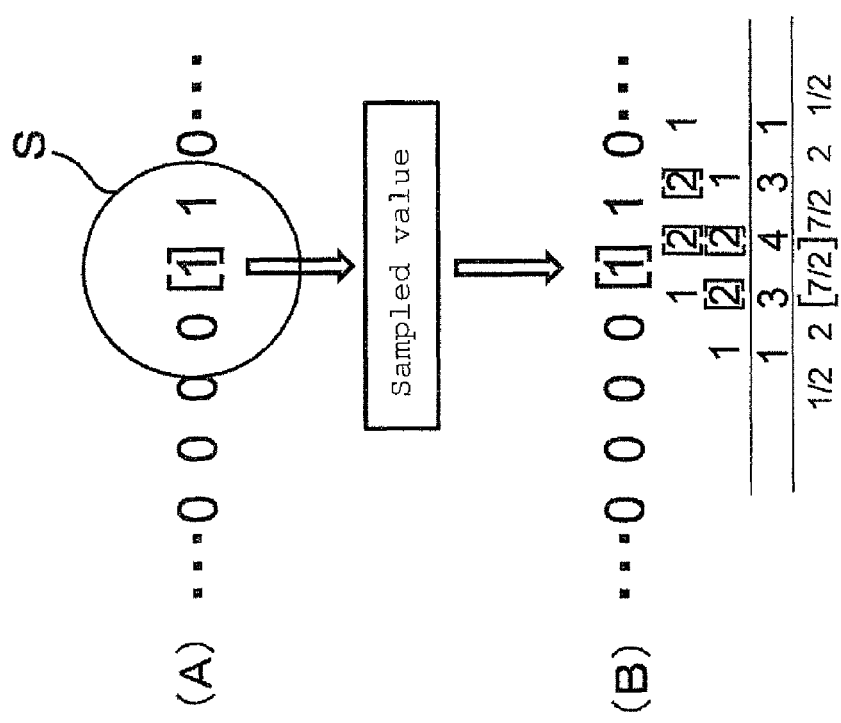
FIGS. 14(A) and 14(B) are conceptual views describing the operation of a comparative data generating unit in the signal evaluation unit.

Moreover, it is also preferable to use a reading apparatus 300 shown in FIG. 13. In the reading apparatus 300, a signal evaluation unit 318 includes a comparison data generating unit 319C. When the constraint length of the PR class in the PRML detection method is an even number, the comparison data generating unit 319C computes an intermediate ideal signal for evaluation using at least adjacent two of output values in the ideal signal recorded in the medium. Specifically, as shown in FIG. 14, the intermediate ideal signal is computed by computing the average of adjacent two of the output values in the ideal signal. Since the output values of the intermediate ideal signal are shifted in phase by half cycle from the values of the original ideal signal, they are synchronized with the sampled values of the bits recorded in the optical recording medium 1.

In the reading apparatus 300, when the constraint length is an even number, the intermediate ideal signal is computed using the ideal signal, and the output timings of the intermediate ideal signal are shifted in phase by half cycle. In this manner, the intermediate ideal signal and the sampled values from a sampling unit 310D can be directly compared to evaluate the sampled values.

In the present embodiments described above, the general evaluation of the real signal at each signal level is performed in the signal evaluation unit by collecting the difference between the real signal and the ideal signal for each signal level. If the signal quality is evaluated at all the signal levels used in the employed encode method, the suitability of the combination of the recording medium and the tap coefficient used in the PRML detection method can be examined objectively. In addition, in the embodiments described above, the average of the real signals is computed at each signal level, and the difference between the computed average and the corresponding value of the ideal signal is determined. When such an evaluation method is used, the signal quality can be evaluated by using a simple apparatus. Moreover, instead of using the average of the signals at each signal level, the most frequent value of the real signals that are collected at each signal level can be used for comparison with the ideal signal. In this case, the influence of an abrupt change in the read signal due to surface defects in the recording medium can be completely eliminated. Furthermore, the data may be normalized such that each of the minimum and maximum signal levels of the statistics at each signal level is set to a predetermined value, and the linearity of the data may be evaluated using the normalized data. In this manner, the signal can be evaluated based not only on the individual signal levels but also on the entire level difference.

Moreover, since the deviation evaluation statistics such as the variances are used in addition to the level evaluation statistics, the instability of the real signal can be evaluated. In particular, when both the level evaluation statistics such as the average values and the deviation evaluation statistics such as the variances are used, the signal quality can be evaluated from different points of view. For example, the level evaluation statistics mainly allow the evaluation of the deviation of the voltage levels of the real signal from those of the ideal signal. In addition, the deviation evaluation statistics mainly allow the evaluation of the stability of the voltage levels.

In the present embodiments described above, the waveform of the real signal is not subjected to any signal processing, but the present invention is not limited thereto. For example, a waveform subjected to PR equalization using an equalizer similar to that used in a real system can be used as the waveform of the real signal.

The signal evaluation method and the like of the present invention are not limited to those described in the above embodiments. Of course, various modifications may be made without departing from the gist of the present invention.

The present invention can be used in various fields in which optical recording-reading is performed using a laser beam or the like.

The entire disclosure of Japanese Patent Application No. 2007-249639 filed on Sep. 26, 2007 including specification, claims, drawings, and summary are incorporated herein by reference in its entirety.

What is claimed is:

1. A method for evaluating a read signal obtained by irradiating a medium with a laser beam through an objective lens and reading data from the reflected laser beam by a PRML detection method, the method comprising:
   a sampling step of sampling the data obtained from the reflected laser beam at clock timings to obtain sampled values; and
   an intermediate data generating step of, when a constraint length of a PR class in the PRML detection method is an even number, computing an intermediate sampled value for evaluation using at least adjacent two of the sampled values arranged in the order sampled at the clock timings.

2. The method for evaluating a read signal according to claim 1, further comprising an evaluation step of comparing the intermediate sampled value with an ideal signal.

3. The method for evaluating a read signal according to claim 2, wherein an average value of the adjacent two of the sampled values is used as the intermediate sampled value.

4. The method for evaluating a read signal according to claim 1, wherein an average value of the adjacent two of the sampled values is used as the intermediate sampled value.

* * * * *